United States Patent Office 3,154,567
Patented Oct. 27, 1964

3,154,567
1 - AMINO - 4 - ARYLAMINOANTHRAQUINONE 2-SULFONIC ACID CONTAINING A BETA-CHLOROETHYLSULFONAMIDO SUBSTITUENT
Julius Eisele, Ludwigshafen (Rhine), Wilhelm Federkiel, Frankenthal, Pfalz, Curt Schuster and Robert Gehm, Ludwigshafen (Rhine), Arnold Tartter, Lambsheim, Pfalz, and Fritz Graser, Werner Rohland, and Erich Stoeckl, Ludwigshafen (Rhine), Germany, assignors to Badische Anilin- & Soda Fabrik Aktiengesellschaft, Ludwigshafen am Rhine, Rhineland-Pfalz, Germany
No Drawing. Original application Dec. 18, 1957, Ser. No. 703,485. Divided and this application May 22, 1959, Ser. No. 818,994
Claims priority, application Germany, Dec. 19, 1956, B 42,872; Aug. 31, 1957, B 45,876; Sept. 10, 1957, B 46,004; Oct. 31, 1957, B 46,616; Nov. 16, 1957, B 46,811
6 Claims. (Cl. 260—372)

This invention relates to dyestuffs which contain at least once the grouping:

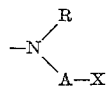

in which R represents a hydrogen atom, an alkyl, aralkyl, cycloalkyl, aryl, halogenalkyl, hydroxylalkyl or acyl group, A an alkylene radical with up to 4 carbon atoms in the chain, which may be branched and/or may contain hydroxyl groups, and X a chlorine or bromine atom, and to new dyestuffs of the above-mentioned kind, and to methods for the production of such dyestuffs.

The invention relates more specifically to dyestuffs which contain at least once the grouping

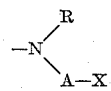

(R, A and X having the above significance) and which are capable of dyeing or printing structures of natural and/or regenerated cellulose.

We have found that valuable dyestuffs of the anthraquinone series are obtained by reacting anthraquinone derivatives which contain sulphonic acid chloride groups with beta- or gamma-halogen alkylamines, or by replacing the hydroxyl groups of the hydroxyalkylamine radicals in anthraquinone derivatives which contain beta- or gamma-hydroxyalkylsulphonic acid amide groups, by halogen atoms with the aid of halogenating agents.

Dyestuffs obtainable according to this invention are for example anthraquinone dyestuffs of the general formula

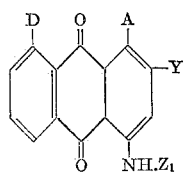

in which A represents a monovalent radical selected from the group consisting of a hydrogen atom, a —NH₂ group and a —NH.Z₂ group, Y a monovalent radical selected from the group consisting of a hydrogen atom and a —SO₃H group, Z₁ a monovalent radical selected from the group consisting of a —Ar.SO₂.X radical, a

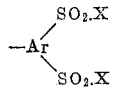

radical and a

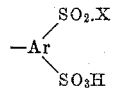

radical, and D a monovalent radical selected from the group consisting of a hydrogen atom and a —NH.Z₂ group, and in which Z₂ represents a monovalent radical selected from the group consisting of a —Ar.SO₂.X radical, a

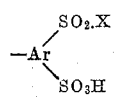

radical and a

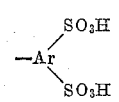

radical, Ar an aromatic radical which contains up to two benzene nuclei, and X the radical of a halogenalkylamine which contains 2 to 4 carbon atoms.

Anthraquinone derivatives containing sulfonic acid chloride groups can be obtained for example by treatment of anthraquinone compounds with chlorsulfonic acid. Anthraquinone compounds suitable for this purpose are for example those which contain one or two arylamino groups on the anthraquinone nucleus, preferably in alpha-positoin, whereby there may be mentioned as arylamino groups, aromatic amino groups which have 1 to 2 benzene nuclei, such as phenyl, diphenyl and naphthylamino groups. It is advantageous if the anthraquinone nucleus also carries one or more sulfonic acid groups.

Of the alpha-monoarylaminoanthraquinones, those are especially well suited which also have an amino group in one of the other alpha-positions of the anthraquinone nucleus. These amino groups may be unsubstituted or also monosubstituted or disubstituted by alkyl groups, such as methyl or ethyl groups. The anthraquinone nucleus itself may also carry, besides the substituents already named, also other substituents, such as alkyl, aryl, alkoxy, aryloxy or acyl groups and/or halogen atoms. The arylamino groups may also have substituents, such as alkyl, aryl, alkoxy, aryloxy or acylamino groups or also halogen atoms or sulfonic acid groups. The following individual examples may be mentioned: 1-amino-4-anilinoanthraquinone, 1-amino-4-paraphenylanilinoanthraquinone, 1-methylamino - 4 - anilinoanthraquinone, 1-amino-2-methyl-4-anilinoanthraquinone, 1-amino-2-brom-4-anilinoanthraquinone, 1-amino-4-anilinoanthraquinone-2-sulfonic acid, 1-amino-4-ortho- (or -meta- or -para-) toluidinoanthraquinone-2-sulfonic acid, 1-amino-4-para-phenylanilinoanthraquinone-2-sulfonic acid, 1-amino-4-para-chloranilinoanthraquinone-2-sulfonic acid, 1-amino-2-brom-4-anilinoanthraquinone-5-sulfonic acid and 1-amino-4-anilinoanthraquinone-2.5-disulfonic acid.

The alpha.alpha'-diarylaminoanthraquinones may also carry amino groups and/or halogen atoms on the anthraquinone nucleus. The aryl radicals, such as the phenyl radical or naphthyl radical, may also have the above-specified substituents. As examples of individual alpha.alpha'-diarylaminoanthraquinones there may be mentioned 1.4-dianilinoanthraquinone, 1.4-ditoluidinoanthraquinone, 1.4-di-paraphenylanilinoanthraquinone, 1.4-di-alpha-naphthylaminoanthraquinone, 1.5-di-para-toluidinoanthraquinone and 1.5-di-paraphenylanilinoanthraquinone.

For the introduction of sulfonic acid chloride groups, suitable anthraquinone compounds are treaded preferably with an excess of chlorsulfonic acid, whereby the latter serves at the same time as a solvent. Temperatures between 0° C. and the boiling point of chlorsulfonic acid, advantageously temperatures of 0° to 110° C. can be used. Depending on the nature of the substituents and the reaction temperature chosen, 1 or 2 sulfonic acid chloride groups may enter into an aryl radical. If an aryl radical already bears sulfonic acid groups, these are converted into sulfonic acid chloride groups. The sulfonic acid chlorides are recovered by pouring the reaction mixture onto ice and water and ice and salt solution, for example, saturated aqueous sodium chloride solution. In the case of arylaminoanthraquinone compounds which carry sulfonic acid groups on the anthraquinone nucleus, these remain unchanged so that sulfonic acid chloride of arylaminoanthraquinones are obtained which still contain sulfonic acid groups.

As beta- or gamma-halogenalkylamines there come into question for example halogenalkylamines which contain up to four carbon atoms such as beta-chlorethylamine, N-methyl-beta-chlorethylamine, 1-chlor-2-aminopropane and gamma-chlorpropylamine.

The anthraquinone compounds containing sulfonic acid chloride groups are reacted with the said halogenalkylamine compounds, which are usually present as hydrohalides, advantageously in aqueous solution in which the anthraquinone compounds containing sulfonic acid groups are finely dispersed, and the halogenalkylamine compound is added in excess. If the hydrogen halide salt of a halogenalkylamine is used, the base is set free with at the most the amount of an alkaline agent which corresponds to the amount of halogenalkylamine hydrohalide, and this is allowed to act on the anthraquinone compound containing sulfonic acid chloride groups if necessary with the addition of, for example, sodium bicarbonate or sodium acetate, preferably at room temperature, until the reaction is complete. The reaction products are recovered, if desired after separation by the addition of a precipitant such as sodium chloride in solid form or in the form of aqueous solution, by filtration and washing. The aqueous pressed material may be used as such for dyeing. It may also be dried at elevated temperatures, but in order to avoid decomposition of the dyestuff, lower temperatures are preferred, for example room temperature, the drying then advantageously being carried out under reduced pressure.

It is also possible in particular to react anthraquinone compounds which do not contain any sulfonic acid groups on the anthraquinone nucleus and which contain in all more than one sulfonic acid chloride group on one or more arylamino radicals, with halogenalkylamines in such a way that less halogenalkylamine is used than corresponds to the amount corresponding to the sulfonic acid chloride groups present. Thus for example in the compound obtained for example from 1.4-di-(para-phenylanilino)-anthraquinone by treatment with chlorsulfonic acid until four sulfonic acid chloride groups have entered into the molecule, only 1, 2 or 3 of the sulfonic acid chloride groups can be reacted with halogenalkylamine. The remaining sulfonic acid chloride group or groups are then saponified to sulfonic acid groups, for example by the addition of sodium acetate, so that arylaminoanthraquinones are obtained which carry on the aryl radical both halogenalkylsulfonic acid amide groups and also sulfonic acid groups.

The halogenalkylsulfonic acid amide compounds of arylaminoanthraquinones may also be prepared by treating arylaminoanthraquinones containing beta- or gamma-hydroxyalkylsulfonic acid amide groups with halogenating agents, for example with thionyl chloride, if desired with the addition of indifferent solvents or diluents, at elevated temperature, for example the temperature of boiling thionyl chloride. The arylaminoanthraquinones containing beta- or gamma-hydroxyalkylsulfonic acid amide groups thereby used can be obtained for example from the corresponding arylaminoanthraquinone sulfonic acid chloride compounds by reaction with beta- or gamma-hydroxyalkylamino compounds, such as beta-hydroxyethylamine, 1-hydroxy-2-aminopropane or gamma-hydroxypropylamine, or also from anthraquinone compounds which contain an exchangeable group, such as 1-amino-4-bromanthraquinone-2-sulfonic acid, by condensation with arylamino-beta- or -gamma-hydroxyalkylsulfonic acid amides, such as for example aniline-3- or -4-sulfonic acid-beta-hydroxyethylamide.

The products of this process are new and valuable dyestuffs, dye animal fibres, such as wool, natural silk or also casein fibres, or fibres of linear polyamides and linear polyurethanes, powerful shades with very good fastness properties.

We have further found that valuable dyestuffs of the anthraquinone series are obtained by acylating anthraquinone derivatives which contain amino groups and which have on the amino groups at least one exchangeable hydrogen atom with arylcarboxylic acid halide sulfonic acid halogen alkylamides.

Such dyestuffs of the anthraquinone series are for example dyestuffs of the general formula

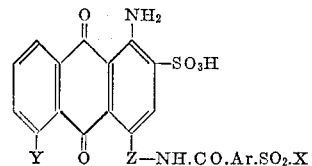

in which Y represents a monovalent radical selected from the group consisting of a hydrogen atom and a —SO$_3$H group, Z an atomic bridge selected from the group consisting of a direct linkage and a —NH.Ar— radical which contains up to two —SO$_3$H groups and is connected by the nitrogen atom to the anthraquinone nucleus, Ar an aromatic radical which contains up to two benzene nuclei, and X the radical of a halogenalkylamine which contains up to four carbon atoms.

As anthraquinone derivatives containing amino groups there come into question especially compounds of the general formula

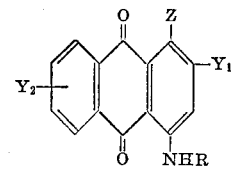

in which Z represents a monovalent radical selected from the group consisting of hydrogen and an amino group, Y$_1$ the group —SO$_3$ (whereby when Y$_2$ is —So$_3$H, Y$_1$ may also be halogen or hydrogen), Y$_2$ hydrogen, halogen or —SO$_3$H and R hydrogen or a hyroaromatic radical with at least one amino group which has a least one exchangeable hydrogen atom (for example a para-aminocyclohexyl radical or a perhydrogenated para-aminobenzylphenyl radical) or an aromatic radical which contains for example up to two benzene nuclei with at least one amino group which contains at least one exchangeable hydrogen atom (for example an aminophenyl, aminodiphenyl, aminophenoxyphenyl, aminostilbyl, para-aminobenzylphenyl, para-aminophenylureidophenyl or aminonaphthyl radical, whereby the aromatic radical may contain, in addition to the free amino groups also substituents such as alkyl, alkoxy, halogen and especially one or more sulfonic acid groups.

Such anthraquinone derivates containing amino groups can be obtained by known methods of example by reacting anthraquinone compounds having exchangeable halogen of the formula

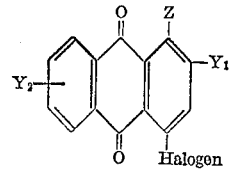

with amines of the formula H₂NR (Z, Y₁, Y₂ and R having the above significance).

As anthraquinone compound having exchangeable halogen there may be mentioned for example 1-amino-4-bromanthraquinone-2-sulfonic acid, 1-amino-4-bromanthraquinone-2.5- or 2.6- or 2.7- or 2.8-disulfonic acid, 1-amino-2.4-dibromanthraquinone-5- or -6- or -7- or -8-sufonic acid, 1-bromanthraquinone-3-sulfonic acid and 1-bromanthraquinone-3.5- or 3.6- or 3.7- or 3.8-disulfonic acid.

As amines, such as aromatic or hydroaromatic amines, which contain up to two benzene nuclei there may be mentioned for example 1.3- or 1.4-diaminobenzene, 1.4-diaminobenzene-2-sulfonic acid, 1.4 diaminobenzene disulfonic acid, 4.4'-diaminodiphenyl and its 3-sulfonic acid, 2.2'-disulfonic acid or 3.3'-disulfonic acid, 3.3'-dimenthyl-4.4'-diaminodiphenyl and its disulfonic acid, 3.3'-dimethoxy-4.4'-diaminodiphenyl and its disulfonic acid, 4.4'-diaminodiphenylmethane, 4.4'-diaminostilbene-2.2'-disulfonic acid, 4.4'-diamonibenzophenone, 4.4'-diaminodiphenylsulfied disulfonic acid, 4.4-diphenylsulfone, 4.4'-diamiodiphenylurea disulfonic acid, 1.4-diaminocyclohexane, 4.4'-diaminododecahydrodiphenylmethane.

Aryl carboxylic acid halide sulfonic acid halogenalkylamides, such as benzene or naphthalene carboxylic acid chloride or bromide sulfonic acid chlor- or bromalkylamides, the aryl radicals of which may also carry substituents, for example alkyl aralkyl, aryl, hydroxyl, alkoxyl, aroxyl, sulfonic acid, sulfonic acid halide alkylamide or nitro groups and/or halogen atoms, such as chlorine or bromine atoms and which may contain for example up to two benzene nuclei, are for example benzoyl chloride-3- or -4-sulfonic acid halogen-alkylamides, 2- or 4-chlorbenzoyl chloride-5-sulfonic acid halogen alkylamides, 4-brombenzoyl chloride-2-sulfonic acid halogen alkylamides, 2- or 4-methylbenzoyl chloride-5-sulfonic acid halogen alkylamides, 2-hydroxybenzoyl chloride-5-sulfonic acid halogen alkylamides, 2-hydroxy-3-methylbenzoyl chloride-5-sulfonic acid halogen alkylamides, 2-methoxybenzoyl chloride-5-sulfonic acid halogen alkylamides, benzoyl chloride-3.5-disulfonic acid halogen alkylamides, 3-nitrobenzoyl chloride-5-sulfonic acid halogen alkylamides, 2-hydroxynaphthalene-3-carboxylic acid chloride-1-sulfonic acid halogen alkylamides, 4-phenylbenzoyl chloride-x-monosulfonic acid halogen alkylamides and naphthalene-1-carboxylic acid chloride-x-monosulfonic acid halogen alkylamides.

These compounds can be obtained for example by converting the corresponding aromatic carboxylic acids in the usual way with chlorsulfonic acid into aromatic carboxylic acid sulfonic acid chlorides or by converting the corresponding aromatic carboxylic acid sulfonic acids also in known manner into their sulfonic acid chlorides and subsequently reacting these with halogen alkylamines to form the aromatic carboxylic acid sulfonic acid halogen alkylamides. These reaction products may be converted for example with halogenating agents, such as thionyl chloride, into the aromatic carboxylic acid chloride sulfonic acid halogen alkylamides. The procedure may however also be that there are prepared from the aromatic carboxylic acid sulfonic acid chlorides with the corresponding hydroxyalkylamines, the aromatic carboxylic acid sulfonic acid hydroxyalkylamides, and these compounds converted for example with halogenating agents, such as thionyl chloride, into the aromatic carboxylic acid chloride sulfonic acid chloralkylamides. As halogen alkylamines there may be mentioned for example halogen alkylamines which contain up to four carbon atoms, such as beta-chlorethylamine, gamma-chlorpropylamine, 1-chlor-2-amino propane and beta-bromethylamine.

The anthraquinone derivatives containing amino groups are reacted, preferably in an aqueous liquid, with the arylcarboxylic acid halide sulfonic acid halogen alkylamides. There may also be used organic solvents, above all those which are miscible with water, such as acetone, dioxane, dimethyl formamide and N-methylpyrrolidone. It is more advantageous to use the solvents which are miscible with water in admixture with water. For example the anthraquinone compound is dissolved or finely dispersed in the said solvents at neutral reaction and a solution of an excess of arylcarboxylic acid halide sulfonic acid halogen alkylamide in acetone is allowed to flow in slowly at temperatures between between −5° C. and about +40° C. preferably at 0° to +10° C. The acid set free is continually neutralized by the addition of agents having an alkaline reaction, such as sodium bicarbonate, sodium carbonate, sodium acetate or dilute aqueous solutions of sodium or potassium hydroxide. The negative logarithm of the hydrogen ion concentration should not be greater than 7. The whole is then stirred for some time, if necessary while warming slowly to room temperature, and the reaction product, if necessary after the addition of neutral salts, separated by filtration and washing. The aqueous pressed material may be used as such for dyeing. It may also be dried at elevated temperatures, but in order to avoid a decomposition of the dyestuff it is preferred to use lower temperatures, for example room temperature, and to dry the dyestuff advantageously under reduced pressure.

The new dyestuffs dye textile materials of animal fibres, such as wool, silk or also casein fibres, or of linear polyamides and linear polyurethanes, powerful shades of color with very good fastness properties.

With the new dyestuff, dyeings and prints of very good fastness to moisture and rubbing can be produced on structures, such as fibres, flocks, threads, woven or knitted fabrics, of natural and/or regenerated cellulose by treating the cellulose with alkaline agents before or during or after the dyeing or printing and then if necessary by heating for a short time of about one to ten minutes to temperatures from 100° C. up to 200° C. There thereby probably takes place a linkage of the dyestuff residue by means of the group A to oxygen atoms of the cellulose, comparable with alkylation, whereby alkali halide is split off.

The dyestuffs which contain the grouping

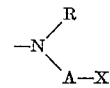

insofar as they are sufficiently soluble in water, can be used for dyeing from aqueous solution. Dyestuff which are insoluble in water are used in finely dispersed form.

The process can be carried out by slop-padding the cellulose with a solution or dispersion of the dyestuff and leading it preferably after drying, through a bath which contains alkali, for example, sodium or potassium hydroxide or carbonate or bicarbonate, the dyestuff then being fixed on the fibre by steaming.

The alkali may, however, also be added to the dyebath and the dyestuff fixed by gradual increase in the bath temperature. Finally, the cellulose may also be pretreated with a solution of alkali hydroxide at elevated temperature, dried, then dyed with a dyestuff of the kind according to this invention and aftertreated with hot air.

Since the reactivity of the halogen atom X is different in each case, the dyeing procedure, i.e., especially the nature and concentration of the alkali, the duration and temperature of the alkali treatment and the steaming or hot air treatment, must be adapted to the dyestuff concerned; the most favorable conditions can readily be determined by preliminary experiments.

The process may be used both with natural and with regenerated cellulose, and indeed both with fibres and with fabrics, flocks, threads and knitted goods.

The dyeing thus obtained has very good fastness to water, washing and rubbing.

In the case of printing, the dyestuff is brought onto the fibre together with a thickening agent, such as sodium alginate or tragacanth, and an alkaline agent, and then dried and steamed. The fabric may also be printed with the dyestuff together with a thickening agent and the usual printing auxiliaries, dried, led through a bath charged with an alkaline agent, dried and then steamed. The prints thus obtained have very good fastness to light, moisture and rubbing.

The following examples will further illustrate this invention but the invention is not restricted to these examples. The parts specified in the examples are parts by weight, and the percentages specified are percentages by weight.

*Example 1*

25 parts of 1-amino-4-anilino-anthraquinone-2-sulfonic acid are introduced at 20° to 25° C. into 250 parts of chlorsulfonic acid and stirred for 2 hours at 20° to 25° C. and for 2 hours at 45° to 50° C. The reactions mixture is then allowed to flow in a thin stream, while stirring vigorously, into a mixture of 1000 parts of ice and 1200 parts of aqueous, saturated sodium chloride solution, filtered and washed with aqueous sodium chloride solution until free from acid. The moist filter material, filtered off sharply by suction, is then made into a paste with 150 parts of ice-water and a cold solution of 56 parts of beta-chlorethylamino-hydrochloride in 150 parts of water is added. While stirring vigorously, 7.2 parts of sodium hydroxide in 40 parts of water and 14.8 parts of anhydrous sodium acetate in 40 parts of water are slowly added. It is stirred for another 20 hours at room temperature, and then the dyestuff is treated with saturated aqueous sodium chloride solution, filtered off by suction and washed with half-saturated aqueous sodium chloride solution until the reaction is neutral. After drying at room temperature there is obtained a dyestuff which dyes wool powerful blue shades of good fastness properties.

A dyestuff having similar properties is obtained by using 62 parts of 1-chlor-2-aminopropane hydrochloride instead of the beta-chlorethylamine hydrochloride.

*Example 2*

25 parts of 1-amino-4-anilinoanthraquinone-2-sulphonic acid are introduced at 20° to 25° C. into 250 parts of chlorsulfonic acid and stirred for 2 hours at 20° to 25° C. and 1 hour at 45 to 50° C. Within an hour it is heated to 100° to 110° C., stirred for 2 hours at this temperature and the reaction material allowed to cool slowly. The reaction mixture is then allowed to flow in a thin stream into a mixture of 1000 parts of ice and 1200 parts of saturated aqueous sodium chloride solution, filtered off and washed with aqueous sodium chloride solution until free from acid. The moist filtered material obtained after filtering off by suction sharply, is then made into a paste with 150 parts of ice-water and treated with a cold solution of 70 parts of beta-chlorethylamine hydrochloride in 180 parts of water. While stirring vigorously, a solution of 20 parts of sodium hydroxide in 100 parts of water is then slowly added. The reaction mixture is stirred for another 24 hours at room temperature, the dyestuff salted out, filtered off by suction and washed with aqueous sodium chloride solution until it has a neutral reaction. After drying at room temperature there is obtained in a good yield a dyestuff which dyes wool currant-colored shades of very good fastness properties.

*Example 3*

20 parts of 1-amino-4-para-phenylanilino-anthraquinone-2-sulfonic acid are introduced at 15° to 20° C. into 200 parts of chlorsulfonic acid and stirred for 2 hours at 20° to 25° C. and for 2 hours at 45° to 50° C. Then the reaction mixture is allowed to flow as described above into a mixture of ice and saturated sodium chloride solution, filtered and washed until free from acid. The moist filtered material, obtained by sharp filtration by suction, is made into a paste with 150 parts of ice-water and, while stirring vigorously, a cold beta-chlorethylamine solution is added which has been prepared from a mixture of 38 parts of beta-chlorethylamine hydrochloride in 100 parts of water and 11 parts of sodium hydroxide in 55 parts of water. It is stirred for 24 hours at room temperature and the dyestuff is filtered off by suction, washed well and dried at room temperature. The dyestuff obtained in a good yield dyes fabric of linear polyamides blue shades of good fastness properties.

*Example 4*

15 parts of 1-amino-4-anilino-anthraquinone are introduced at 15° to 20° C. into 150 parts of chlorsulfonic acid, stirred for 3 hours at room temperature, heated in an hour to 100° and stirred for 2 hours at this temperature. After slowly cooling, the reaction mixture is poured into a mixture of ice and water, filtered and washed until free from acid. The moist pressed material is made into a paste with ice-water and there is slowly added a solution of beta-chlorethylamine which has been prepared from a mixture of 45 parts of beta-chorethylamine hydrochloride in 150 parts of water and 13.5 parts of sodium hydroxide in 50 parts of water. After stirring for about 48 hours at room temperature, it is filtered and the dyestuff washed with dilute salt solution until the reaction is neutral and dried at room temperature. A good yield of a dyestuff is obtained which dyes wool in very fast currant-colored shades.

*Example 5*

27.5 parts of 1.5-di-para-toluidino-anthraquinone are introduced at 20° to 25° C. into 275 parts of chlorsulfonic acid. It is stirred for 2 hours at room temperature, 4 hours at 60° to 65° C., allowed to cool and stirred for 16 hours at room temperature. Then the reaction product is introduced into a mixture of ice and water, filtered, washed free from acid and the moist filtered material made into a paste with 150 parts of ice-water. Then while stirring vigorously, a beta-chlorethylamine solution is added which has been prepared from a mixture of 62 parts of beta-chlorethylamine hydrochloride in 180 parts of water and 19 parts of sodium hydroxide in 80 parts of water, stirred for 40 hours at room temperature, filtered by suction and washed until there is a neutral reaction. After careful drying a dyestuff is obtained in a good yield which dyes natural silk red shades of good fastness properties.

*Example 6*

25 parts of 1.4-di-(para-phenylanilino)-anthraquinone are introduced at 5° to 10° C. into 250 parts of chlorsulfonic acid, the temperature allowed to rise to 20° to 25° C., stirred for 2 hours at this temperature, heating during the course of an hour to 100° C. and stirred for 3 hours at this temperature. After slow cooling, the reaction material is poured into a mixture of ice and water, filtered and washed free from acid. The moist filtered material is made into a paste with 150 parts of ice-water and then a solution of 11 parts of beta-chlorethylamine hydrochloride in 30 parts of water are added. While stirring vigorously, there is gradually added a solution of 3.6 parts of sodium hydroxide and 18.9 parts of anhydrous sodium acetate in 50 parts of water and stirred for 48 hours at room temperature. It is then filtered by suction, washed well with 10% aqueous sodium chloride solution and dried at room temperature. The dyestuff obtained in a good yield and which contains sulfonic acid groups as well as beta-chlorethylsulfonic acid amido groups, dyes wool green shades of excellent fastness properties.

By using 12.1 parts of 1-chlor-2-aminopropane hydrochloride or 12.1 parts of gamma-chlorpropylamine hydrochloride instead of beta-chlorethylamine hydrochloride dyestuffs having similar properties are obtained.

By replacing the 11 parts of beta-chlorethylamine hydrochloride and 3.6 parts of sodium hydroxide by 16.5 parts of beta-chlorethylamine hydrochloride and 5.4 parts of sodium hydroxide or by 5.5 parts of beta-chlorethylamine hydrochloride and 1.8 parts of sodium hydroxide, quite similar dyestuffs can be obtained.

*Example 7*

20 parts of 1-amino-4-anilino-anthraquinone are reacted as described in Example 4 with 200 parts of chlorsulfonic acid. The resultant disulfonic acid chloride in the form of a moist pressed material is made into a paste with 150 parts of ice-water and a solution of 7.5 parts of beta-chlorethylamine hydrochloride in 20 parts of water is added. While stirring vigorously, there is slowly added a solution of 2.5 parts of sodium hydroxide and 13 parts of anhydrous sodium acetate in 30 parts of water and further stirred for 48 hours at room temperature. The dyestuff is salted out and washed with aqueous sodium chloride solution until its reaction is neutral. The dyestuff which is obtained in a good yield contains about one beta-chlorethyl-sulfonic acid amide group and about one sulfonic acid group per molecule. It dyes wool violet shades of good fastness properties.

*Example 8*

25 parts of 1.4-di-(alpha-naphthylamino)-anthraquinone are introduced at 5° to 10° C. into 250 parts of chlor-sulfonic acid, the temperature is allowed to rise to 20° to 25° C., stirred for 2 hours at this temperature, then heated during the course of 2 hours to 90° to 100° C. and then stirred for an hour at this temperature. After cooling, the reaction material is poured into a mixture of ice and water, filtered and washed free from acid. The moist filter material is made into a paste with 150 parts of water and a solution of 12 parts of beta-chlorethylamine hydrochloride in 30 parts of water is introduced. While stirring vigorously, a solution of 4.1 parts of sodium hydroxide and 21 parts of anhydrous sodium acetate in 50 parts of water is introduced a little at a time and further stirred for 48 hours at room temperature. It is then filtered by suction, washed well with water and dried at room temperature. The dyestuff obtained in a good yield and which contains sulfonic acid groups as well as beta-chlorethyl-sulfonic acid amide groups, dyes wool green shades of good fastness properties.

*Example 9*

25 parts of 1-amino-4-meta-toluidino-anthraquinone-2-sulfonic acid are introduced at 20° to 25° C. into 250 parts of chlorsulfonic acid and stirred for 2 hours at this temperature and for another 2 hours at 45° to 50° C. The reaction mixture is then allowed to flow in a thin stream while stirring vigorously into a mixture of 1000 parts of ice and 1200 parts of aqueous saturated sodium chloride solution, filtered off and washed free from acid with aqueous sodium chloride solution. The moist filtered material, which has been sharply filtered off by suction, is then made into a paste with 150 parts of ice-water and stirred with a cold mixture of 56 parts of beta-chlorethylamine hydrochloride in 150 parts of water and 17 parts of sodium hydroxide in 80 parts of water. After 36 hours of stirring at room temperature, the dyestuff is filtered off by suction, washed well with aqueous sodium chloride solution and dried at room temperature. The dyestuff which is obtained in a good yield dyes wool blue shades with good fastness properties.

By using 62 parts of 1-chlor-2-aminopropane hydrochloride instead of beta-chlorethylamine hydrochloride, a dyestuff having similar properties is obtained.

*Example 10*

25 parts of 1-meta-toluidino-anthraquinone-3-sulfonic acid are introduced at 20° to 25° C. into 250 parts of chlorsulfonic acid and the mixture stirred for 2 hours at this temperature and for another 2 hours at 45° to 50° C. While stirring vigorously, the reaction mixture is then allowed to flow in a thin stream into a mixture of 1000 parts of ice and 1000 parts of aqueous saturated potassium chloride solution, filtered off and washed free from acid with aqueous potassium chloride solution. The moist filtered material, sharply filtered off by suction, is then made into a paste with 150 parts of ice-water and mixed with a cold solution of 56 parts of beta-chlorethylamine hydrochloride in 150 parts of water. While stirring vigorously, 10 parts of potassium hydroxide in 40 parts of water and 17.6 parts of potassium acetate in 40 parts of water are added. The whole is stirred for 20 hours at room temperature and the precipitate then treated with saturated aqueous potassium chloride solution, filtered off by suction and washed well with aqueous potassium chloride solution. After drying at room temperature, a dyestuff is obtained which dyes wool orange shades with good fastness properties.

*Example 11*

38 parts of 1-amino-4-(anilino-para-sulfonic acid-beta-hydroxyethylamide)-anthraquinone-2-sulfonic acid are introduced into 600 parts of thionyl chloride. 12 parts of anhydrous pyridine are added and the whole stirred for 40 hours at room temperature. It is then filtered, adherent thionyl chloride washed out with cyclohexane and the filtered material treated with 15% aqueous potassium chloride solution.

It is filtered again and washed with potassium chloride solution. A good yield of a dyestuff is obtained in which the hydroxyl group has been replaced by chlorine and which dyes wool blue shades with good fastness properties.

*Example 12*

25 parts of the anthraquinone compound which can be obtained from 1.4-di-(para-phenylanilino)-anthraquinone by the introduction of four sulfonic acid chloride groups by means of chlorsulfonic acid, reaction of about two sulfonic acid chloride groups with beta-hydroxyethylamine to form sulfonic acid-beta-hydroxyethylamide groups and hydrolysis of the remaining sulfonic acid chloride groups to sulfonic acid groups, are introduced into 150 parts of N-dimethyl formamide and slowly treated with 30 parts of thionyl chloride while stirring and cooling. The whole is stirred further for about 5 hours at room temperature, the reaction mixture poured into a mixture of ice and water, filtered and washed with aqueous sodium chloride solution until the washing solution has a neutral reaction. After drying at room temperature there is obtained a dyestuff which like the dyestuff of Example 6 dyes wool green shades of good fastness properties.

*Example 13*

10.6 parts of the anthraquinone compound which is obtained by condensation of 1 mol of 1-amino-4-bromanthraquinone-2-sulfonic acid with 1 mol of 1.4-diaminobenzene monosulfonic acid, are dissolved in 300 parts of water. Into the solution cooled to 0° to +5° C., a solution of 10 parts of benzoyl chloride-para-sulfonic acid-beta-chlorethylamide in 30 parts of acetone is allowed to flow slowly while stirring vigorously. The hydrogen chloride formed during the reaction is continually neutralized by the addition of a total of about 25 parts of a 10% aqueous sodium carbonate solution. The whole is further stirred for about 2 to 3 hours at about 5° to 10° C., and the dyestuff deposited by the addition of sodium chloride, filtered and washed with 15% aqueous sodium chloride solution. After drying at room temperature under reduced pressure, a good yield of a dyestuff is obtained which dyes wool fast powerful blue shades.

If benzoyl chloride-meta-sulfonic acid-beta-chlorethylamide be used instead of benzoyl chloride-para-sulfonic acid-beta-chlorethylamide, a quite similar dyestuff is obtained in a good yield.

By replacing the benzoyl chloride-para-sulfonic acid-beta-chlorethylamide by benzoyl chloride-para-sulfonic acid-beta-chlorisopropylamide or benzoyl chloride-meta-sulfonic acid-beta-chlorisopropylamide, dyestuffs with quite similar properties can be obtained in good yields.

Example 14

12.9 parts of the anthraquinone compound which is obtained by condensation of 1 mol of 1-amino-4-bromanthraquinone-2-sulfonic acid with 1 mol of 4.4'-diaminodiphenyl-2.2'-disulfonic acid are dissolved in 200 parts of water and acylated with 10 parts of benzoyl chloride-para-sulfonic acid-beta-chlorethylamide as described in Example 13. Then 2000 parts of a saturated aqueous potassium chloride solution are added and the product is filtered off and washed with 15% aqueous potassium chloride solution and dried at room temperature under reduced pressure. There is obtained in a good yield a dyestuff which dyes fabric of linear polyamide very fast powerful blue shades.

By using benzoyl chloride-para-sulfonic acid-beta-chlorisopropylamide instead of benzoyl chloride-para-sulfonic acid-beta-chlorethylamide, a quite similar dyestuff is obtained in a good yield.

Example 15

11.3 parts of the anthraquinone compound which is obtained by condensation of 1 mol of 1-amino-4-bromanthraquinone-2-sulfonic acid with 1 mol of 4.4'-diaminodiphenyl-3-sulfonic acid are dissolved in 400 parts of water and acylated with benzoyl chloride-para-sulfonic acid-beta-chlorethylamide as described in Example 13. The product is filtered off by suction, washed with 2% aqueous sodium chloride solution and dried at room temperature under reduced pressure. A good yield of a dyestuff is obtained which dyes wool powerful blue shades which are very fast.

Example 16

12 parts of the anthraquinone compound which is obtained by condensation of 1 mol of 1-amino-4-bromanthraquinone-2-sulfonic acid with 1 mol of 4.4'-diaminostilbene-2.2'-disulfonic acid, are dissolved in 300 parts of water and acylated with 10 parts of benzoyl chloride-para-sulfonic acid-beta-chlorethylamide as described in Example 13. After treatment with sodium chloride, washing and drying at room temperature, a good yield of a dyestuff is obtained which dyes natural silk green shades of good fastness.

If benzoyl chloride-meta-sulfonic acid-beta-chloroethylamide be used instead of benzoyl chloride-para-sulfonic acid-beta-chlorethylamide, a very similar dyestuff is obtained in a good yield.

Example 17

10.5 parts of the anthraquinone compound which is obtained by condensation of 1 mol of 1-amino-4-bromanthraquinone-2.5-disulfonic acid with 1 mol of 4.4'-diaminodiphenyl-3-sulfonic acid are acylated with 9 parts of benzoyl chloride-para-sulfonic acid-beta-chlorethylamide as described in Example 13. After treatment with sodium chloride, washing and drying at room temperature, a dyestuff is obtained in a good yield which dyes wool very fast bluish green shades.

Example 18

6.7 parts of 1.4-diaminoanthraquinone-2-sulfonic acid are dissolved in 200 parts of water which contain 0.8 part of sodium hydroxide and acylated with 10 parts of benzoyl chloride-para-sulfonic acid-beta-chlorethylamide as described in Example 13. After treatment with sodium chloride, washing and drying there is obtained a good yield of a dyestuff which dyes fabric of linear polyamide fast violet shades.

Example 19

21.2 parts of the anthraquinone compound which is obtained by condensation of 1 mol of 1-amino-4-bromanthraquinone-2-sulfonic acid with 1 mol of 1.4-diaminobenzene monosulfonic acid, are dissolved in 600 parts of water. Into the solution cooled to 0° to +5° C. there is allowed to flow slowly, while stirring vigorously, a solution of 22 parts of 2-chlorobenzoyl chloride-4-sulfonic acid-beta-chlorethylamide in 60 parts of acetone. The hydrogen chloride formed during the reaction is continuously neutralized by the addition of a total of about 45 parts of a 10% aqueous sodium carbonate solution. The whole is stirred for about 2 to 3 hours at about 5° to 10° C., the dyestuff is deposited by the addition of potassium chloride, filtered and washed with 5% aqueous potassium chloride solution. After drying at room temperature under reduced pressure, a good yield of a dyestuff is obtained which dyes wool very fast powerful blue shades.

Example 20

By following the procedure described in Example 19 and using instead of 2-chlorobenzoyl chloride-4-sulfonic acid-beta-chlorethylamide, 21 parts of 4-methylbenzoyl chloride-3-sulfonic acid-beta-chlorethylamide, there is obtained a good yield of a dyestuff which dyes fabric of linear polyamide blue with good fastness.

Example 21

By following the procedure described in Example 19 and using, instead of 2-chlorbenzoyl chloride-4-sulfonic acid-beta-chlorethylamide, 32 parts of benzoyl chloride-3.5-di-(sulfonic acid-beta-chlorethylamide) in 90 parts of acetone, there is obtained a good yield of a dyestuff which dyes wool fast blue shades.

This is a divisional application of copending application Serial Number 703,485 filed on December 18, 1957, by Julius Eisele, Curt Schuster, Arnold Tartter, Werner Rohland, Wilhelm Federkiel, Robert Gehm, Fritz Graser and Erich Stoeckl.

What we claim is:

1. 1-amino-4-arylaminoanthraquinone - 2-sulfonic acid dyestuffs containing the substituent group

which dyestuffs are selected from the group consisting of

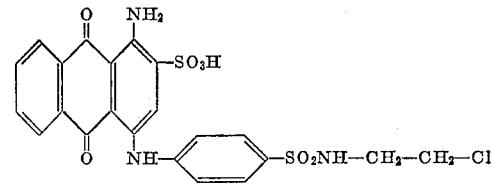

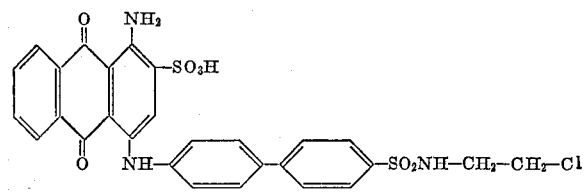

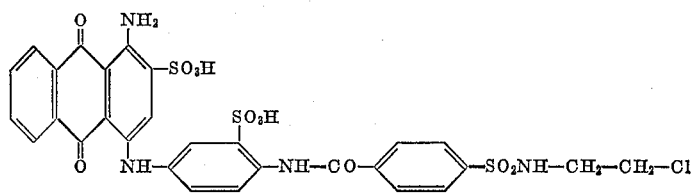

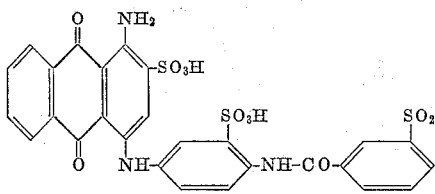

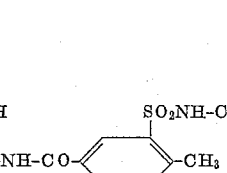

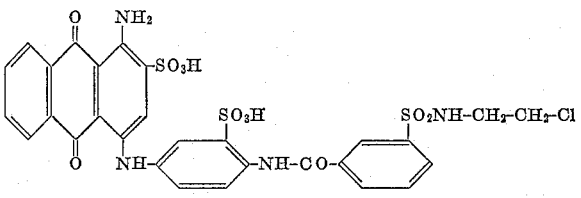

4. The 1-amino-4-arylaminoanthraquinone - 2-sulfonic acid dyestuff of the formula

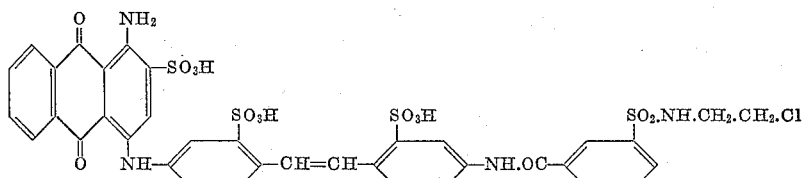

and

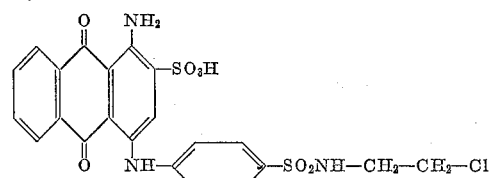

2. The 1-amino-4-arylaminoanthraquinone - 2-sulfonic acid dyestuff of the formula

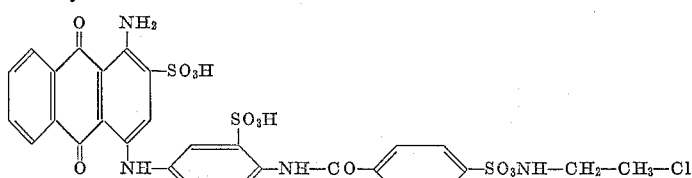

3. The 1-amino-4-arylaminoanthraquinone - 2-sulfonic acid dyestuff of the formula 5. The 1-amino-4-arylaminoanthraquinone - 2-sulfonic acid dyestuff of the formula

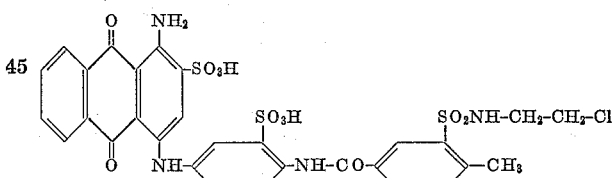

6. The 1-amino-4-arylaminoanthraquinone - 2-sulfonic acid dyestuff of the formula

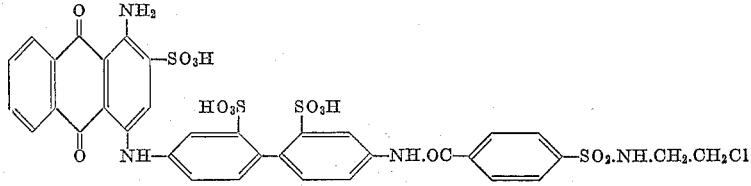

References Cited in the file of this patent
UNITED STATES PATENTS

| | | |
|---|---|---|
| 2,430,771 | Kern | Nov. 11, 1947 |
| 2,494,240 | Gutzwiller | Jan. 10, 1950 |
| 2,586,233 | Kern et al. | Feb. 19, 1952 |
| 2,670,356 | Weinard | Feb. 23, 1954 |

UNITED STATES PATENT OFFICE
CERTIFICATE OF CORRECTION

Patent No. 3,154,567                                           October 27, 1964

Julius Eisele et al.

It is hereby certified that error appears in the above numbered patent requiring correction and that the said Letters Patent should read as corrected below.

Column 4, line 49, for "$-SO_3$" read -- $-SO_3H$ --; line 52, for "a" read -- at --; column 6, line 9, strike out "between", second occurrence.

Signed and sealed this 6th day of April 1965.

(SEAL)
Attest:

ERNEST W. SWIDER                                           EDWARD J. BRENNER
Attesting Officer                                               Commissioner of Patents